United States Patent
Johnstone et al.

(10) Patent No.: US 6,424,628 B1
(45) Date of Patent: Jul. 23, 2002

(54) ANALYZING SIGNALS

(75) Inventors: Colin Johnstone; William Ross MacIsaac, both of Fife (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/209,777

(22) Filed: Dec. 11, 1998

(30) Foreign Application Priority Data

Dec. 15, 1997 (EP) ............................................. 97310122

(51) Int. Cl.[7] .................................................. H04J 1/16
(52) U.S. Cl. ...................................................... 370/241
(58) Field of Search ................................. 370/241, 389, 370/232, 233, 242, 245, 247, 248, 250, 251, 252, 253, 254, 216, 227, 228, 461, 462

(56) References Cited

U.S. PATENT DOCUMENTS

| | | |
|---|---|---|
| 5,265,089 A | 11/1993 | Yonehara |
| 5,282,211 A | 1/1994 | Manlick et al. |
| 5,452,286 A | 9/1995 | Kitayama |
| 5,475,688 A * | 12/1995 | Bridgewater et al. ....... 370/394 |
| 6,064,650 A * | 5/2000 | Kappler et al. ............. 370/412 |

FOREIGN PATENT DOCUMENTS

| | | |
|---|---|---|
| EP | 0265080 A1 | 4/1988 |
| EP | 0456974 A2 | 11/1991 |
| GB | 2252888 A | 8/1992 |
| JP | 60140949 | 7/1985 |

OTHER PUBLICATIONS

"Sonet Measurements in the Real World", by Mark Dykes, *Annual Review of Communications*, vol. 46, Jan. 1992, pp. 731–738.

* cited by examiner

Primary Examiner—Dang Ton

(57) ABSTRACT

The invention provides a method of identifying framing bits in order to correctly frame a test signal comprising a data payload in the form of a pseudo random binary sequence (PRBS), split into frames by a number of framing bits, after disruption and re-establishment of transmission of the test signal. The method comprises comparing the test signal to a comparison PRBS, and determining the position of the framing bits, or other non-payload data, based on the position of mismatches between the incoming test signal and the comparison PRBS. Errors may be deliberately introduced before transmission of the test signal, in a predetermined position relative to the non-payload data bits, so that analysis of the payload data is used to identify the framing elements.

17 Claims, 9 Drawing Sheets

ANALYZING SIGNALS

The present invention relates to a method of, and apparatus for, analysing signals in order to identify non-payload data elements in an incoming data stream. The method is especially suitable for use in rapidly identifying framing elements in a framed test signal, which enables efficient and effective measurement of the length of any service disruptions.

Telecommunications networks send large amounts of data, including voice communications, throughout the world. Since the delivery of this data is very important the traffic channels which transmit this data are frequently backed up with one or more protection channels, one of which takes over the transmission of data if one of a number of traffic channels fails. When a failure is detected in a channel, (for example when a cable is damaged) the data loss or degradation is detected at the receiving end, and a message sent back to the sending end to switch the transmission of the channel's data to a protection channel.

New equipment must act at defined speeds to detect a data loss, switch to the protection channel and re-establish data transmission. In order to ensure that the equipment complies with required criteria, the time taken to re-establish transmission in the event of failure must be measured. Telecommunications test sets are used to test new links before they are made live. Amongst the many tests carried out is a measurement of the time it takes to perform a protection switch. This measures the time that the service is disrupted and is termed a "service disruption" test.

Known methods of service disruption measurement include use of a Pseudo-Random Binary Sequence (PRBS) which is sent as a test signal from the sending end. A delayed PRBS is generated by receiving equipment at the receiving end of the test apparatus and compared with the incoming signal. When data is being reliably transferred, the PRBS generated at the receiving end matches the incoming signal and no mismatches are detected. When a protection switch is induced, the delayed PRBS fails to match the incoming signal and a time counter is started. The receiving equipment then continuously seeds its PRBS generator with the incoming (faulty) signal and looks for mismatches between the incoming signal and the delayed PRBS. When a mismatch is detected, the receiving equipment re-seeds its PRBS generator and the process repeats until the generated sequence again matches the incoming signal. If the match persists for an accepted, predetermined time (e.g. 200 ms) then the protection switch time is taken as the time from the initial mismatch until the last error was detected. In order to record accurately the time that the incoming signal becomes fault-free and matching is re-established, the value of the time counter is latched every time the receiving equipment re-seeds its PRBS generator or detects a mismatch. Thus after the required mismatch-free time has elapsed the latch contains the time of the duration of the service disruption.

Whilst a raw PRBS patterns which may be regarded as the payload data, can sometimes be sent through a telecommunications network it is often necessary to include frame alignment information in a test signal in order to allow the equipment being tested to function. The signal is divided into frames and each frame comprises a small number of framing and housekeeping bits and a relatively large number of payload data bits. This introduces a problem into the service disruption measurement in that when the test signal is once again received by the receiving end after a disruption it will not be known which bits are payload data bits and which are framing/housekeeping bits. If a non-payload data bit (such as a housekeeping or framing bit is taken as a PRBS payload data bit, a PRBS mismatch will occur and the receiving equipment will not accurately detect when the incoming signal has been restored.

Prior art methods and apparatus have provided several ways to effect framing of the incoming signal.

For ITU E1–E4 rates the framing sequence is a group of 8 to 12 bits at the start of a 125 $\mu$s frame. The housekeeping bit follows immediately so that all the non-payload data bits are grouped together. Framing circuits in the receiving equipment detect a first framing bit sequence in a first frame and then look for another in the same position in the next frame. Using this technique, a frame will generally be found within a small number of frame periods. Thus the service disruption measurement can be made with a relatively short framing time. Once reception of the test signal is re-established and the framing of the signal is determined, the payload PRBS can be examined for the existence of errors. The receiving equipment interprets the error-free condition as indicating restoration of the incoming data signal, and records the time elapsed since the beginning of the disruption.

At ANSI rates of T1 and T3 (DS1 and DS3) the situation is somewhat different. In this case the framing and housekeeping bits are evenly spaced throughout the payload data. In the case of T1 they are 193 bits apart, and in the case of T3 the framing/housekeeping bits 85 bits apart.

Framing is generally performed by selecting a bit, and a corresponding later bit where one would expect the next framing bit to occur (i.e. 170 or 386 bits later) if the initially selected bit were a framing bit. If the later bit does not match the framing sequence, then the initially selected bit was not a framing bit, so the next bit of the incoming signal is selected and the test is repeated.

The time taken to detect frame alignment with circuits of this nature can be many tens or even hundreds of milliseconds. Only when the framing sequence is detected can payload analysis, and then any service disruption measurement, take place.

The order of magnitude of time for operation of a protection switch is a few milliseconds up to a typical maximum of around 50 ms. The framing to allow analysis of the payload must be faster than this in order to allow the above technique for measuring service disruption to be used effectively.

It is therefore desirable to identify the framing sequence, by identifying the non-payload data elements, more quickly and efficiently.

According to a first aspect of the present invention there is provided a method in accordance with claim 1.

According to a second aspect of the present invention there is provided apparatus in accordance with claim 17.

Embodiments of the present invention will be described, by way of example, with reference to the accompanying drawings in which.

Figure 1:
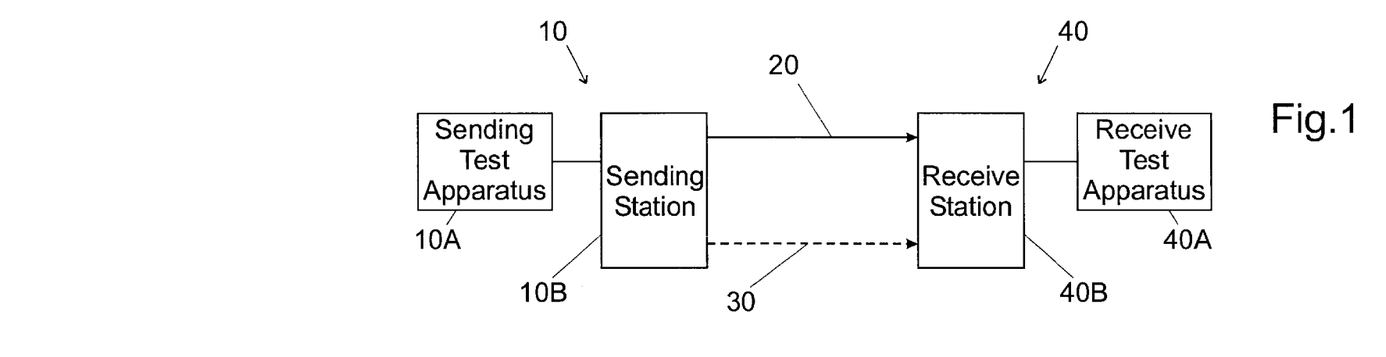
FIG. 1 illustrates schematically a test system for testing protection switching in a telecommunication system.

With reference to the accompanying drawings an embodiment of a method of analysing signals is performed by a test system for testing a protection switch. The test system comprises a sending station 10, which includes sending test apparatus 10A and a sending telecommunications station 10B, a traffic channel 20, a protection channel 30 and a receiving station 40 which includes receiving test apparatus 40A and a receiving telecommunications station 40B. The sending telecommunications station 10B, traffic channel 20, protection channel 30 and receiving telecommunications station 40B constitute the apparatus being tested. In commercial applications there may be a number of traffic channels and/or a number of protection channels, some of which may correspond to routing through a separate telecommunications station. For simplicity, these variants are not illustrated.

Figure 2:
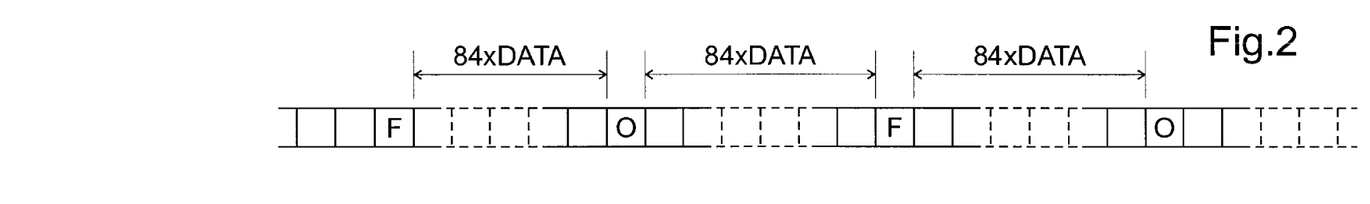
FIG. 2 illustrates schematically a DS3 data stream.
Figure 3:
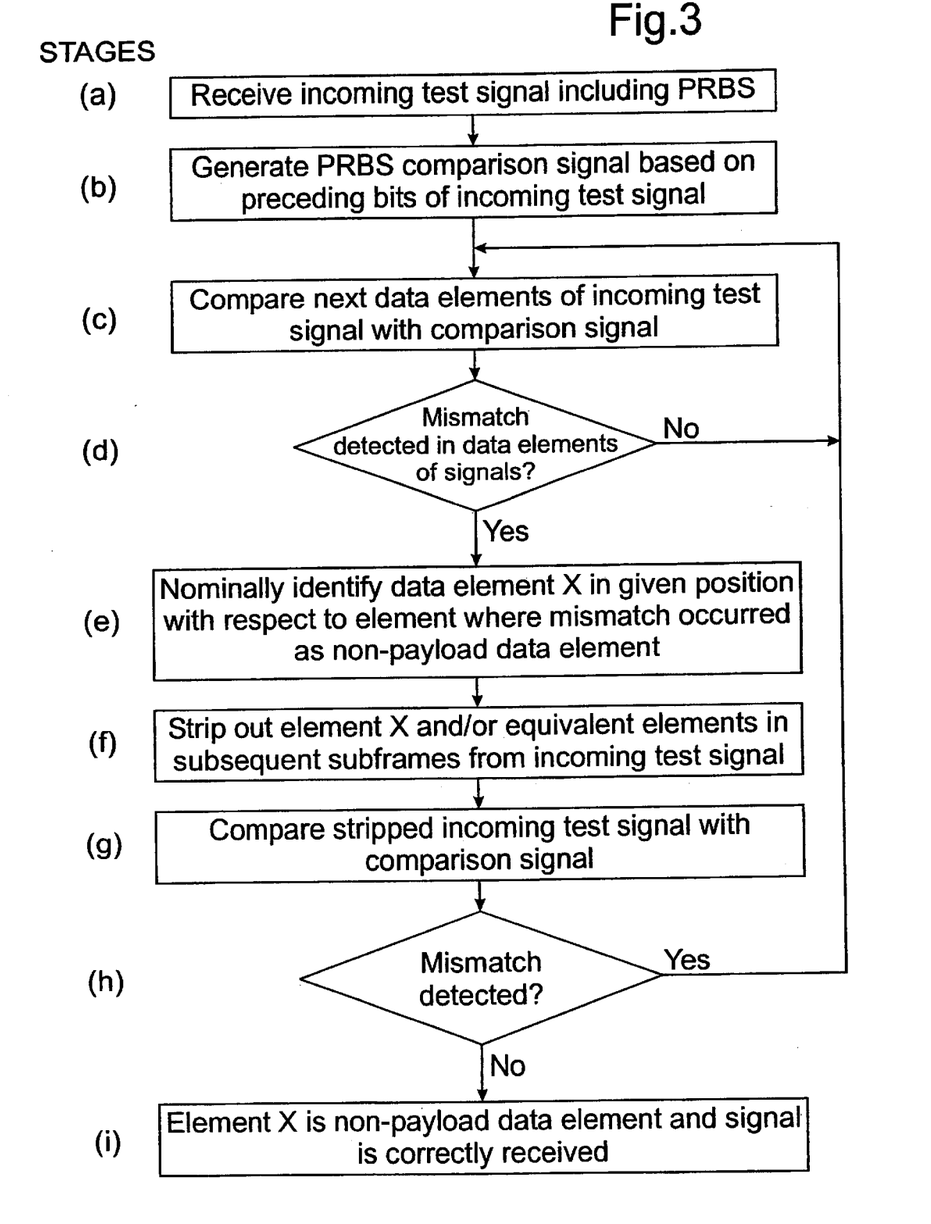
FIG. 3 is a flow diagram illustrating a method in accordance with the present invention in simplified form.

The sending test apparatus 10A generates a test signal, which in a described embodiment, is in the form of a DS3 data stream as illustrated in FIG. 2. The test signal comprises a pseudo random binary sequence (PRBS) to act as a payload signal and also contains non-payload data. In this embodiment the non-payload data are in the form of framing bits, designated F in FIG. 2 and overhead bits designated O in FIG. 2. The signal is divided into subframes by the non-payload data bits, each subframe being 85 bits long and comprising 84 payload data bits and one non-payload (framing or overhead) data bit. FIG. 3 illustrates, in simple schematic block diagram form, an embodiment of a method in accordance with the present invention, suitable for use with a DS3 signal.

(a) A PRBS signal, for use as an incoming test signal, generated at the sending station 10 is received at the receiving station 40. (b) A comparison signal is generated at the receiving station, based on the preceding data elements of the incoming test signal. (c) The signals are compared and when (d) a mismatch is detected the apparatus at the receiving station 40 nominally identifies (at stage (e)) a data element in the incoming signal which has a predetermined positional relationship to the data element with which the mismatch was detected, as a non-payload data element. At (f) the nominally identified non-payload data element is stripped out of the incoming signal. It will be appreciated that depending of the way that non-data elements are inserted into the PRBS signal, some form of processing other than stripping out, which is used in this embodiment, may be appropriate: the essence is to process the incoming test signal so that if the nominally identified non-payload data element is indeed a non-payload data element in a clean signal, the processing will reconstitute the PRBS signal from the incoming signal. Then (g) the stripped signal is compared to a comparison signal generated at the receiving station 40. If mismatches are detected (h), then the stripped signal does not correspond to the PRBS of the test signal and it is therefore evident that the nominally identified non-payload data element was not, actually, a non-payload data element (or that the incoming signal is not error-free) in which case it is necessary to search for a further mismatch, that is, to go back to step (c). If no mismatches are found, then (i) it is evident that the stripped signal corresponds to the PRBS of the test signal and that the non-payload data element is correctly identified and the incoming signal correctly framed.

The relationship between the position of the data element in which the mismatch is identified and the nominally identified non-payload data signal may be simply that they are the same data element. In this case the mismatch occurs because the non-payload data element (that is the framing or overhead element) is not part of the PRBS. The first non-payload data bit in an error free signal has a 50% chance of conforming to the PRBS signal, and a 50% chance of violating the PRBS signal. Thus a system that relies on detecting a mismatch which is the non-payload data bit itself has a 50% chance of detecting the first framing data element in an error-free signal. Correct framing is determined after a number (for example two) mismatch-free payloads. This approach is adequate for normal payloads, as the framing element is detected after a small number of frames.

In some cases, in particular because of relatively long frame length, such as in the DS1 case, this technique is not always sufficiently fast.

In order to raise the speed of the framing process the PRBS is, in a preferred embodiment, provided with an inverted (i.e. error or PRBS violation) bit in a predetermined position before each non-payload data element. A preferred position, for DS3 circuits, is eight bits before each non-payload data element. In this way the violation occurs reliably before every non-payload data element, irrespective of whether the non-payload data bit itself violates the PRBS, so the framing data element may be reliably detected earlier and the framing sequence may be restricted to less than two frames.

It will be appreciated that if PRBS violations are introduced into the test signal then these must be allowed for when testing the stripped (or otherwise processed) signal against the PRBS at steps (g) and (h). In a preferred embodiment this is achieved by rectifying the errors before comparison. This also provides an error-free signal which can be output from the apparatus.

A more specific embodiment of apparatus in accordance with the present invention will now be described with particular reference to FIG. 4.

The receiving test apparatus 40B includes receiving apparatus which comprises an input 41 for receiving the incoming signal from the sending station 10. A DS3 signal is extracted by a converter 42 and passed down as eight bit wide bus, represented by the bold arrows in FIG. 4. The test signal also includes one inverted bit in every subframe, in a fixed relationship to the non-payload data bit. In the preferred embodiment the inverted payload data bits are placed eight bits before the non-payload data bits. The receiving apparatus further includes a first open loop PRBS detector 44 (such as a Westcott PRBS detector) which is seeded by the incoming signal from the sending station 10 and, in this embodiment, calculates the next eight bits of the PRBS from the preceding 16 bits. The first detector 44 thus performs stages (c) to (e) of FIG. 3.

The receiving apparatus further includes a barrel shifter 45 which includes the facility to remove identified non-payload data bits from the signal (step (f) as shown in FIG. 3). The incoming data stripped of the non-payload data, designated by the reference numeral 46 in FIG. 3, is fed to a second open loop PRBS detector 47 which performs stage (g) as shown in FIG. 3. The second open loop PRBS detector 47 includes the capacity to rectify the deliberately inverted bits in the payload data and can thus output the error-free PRBS 48.

The apparatus further includes a frame byte counter 49 and a controller 50. The frame byte counter 49 can receive signals relating to detection of mismatches from the controller 50 and, in response, initialise the alignment of the barrel shifter 45.

In use the first open loop PRBS detector 44 compares its internally generated PRBS with the 8-bit wide incoming signal 43. When a mismatch is detected the detector 43 provides error report outputs to the barrel shifter 45 and to the controller 50. The error report outputs cause the barrel shifter 45 and the counter 49 to be initialised to an alignment based upon the position of the nominally identified non-payload data bit (framing bit).

If only one bit in the eight bit byte is mismatched, then the detector outputs are provided in a known pattern from which the position of the mismatched bit is evident.

If more than one mismatch is detected in a single byte then the relationship between the number of errors and the positions of the error is complex. For this reason the inverted bits provided by the sending station are arranged to be exactly eight bits before the non-payload data bit of a subframe, so that when a single mismatch is detected in a byte the non-payload data bit is treated as being in the same position as the mismatched bit but in the following byte. When a mismatch is detected by the first detector 44, the receiving apparatus aligns as if the mismatched bit in the incoming signal is the deliberately introduced inverted bit in the payload data and, therefore, as if the position of the next non-payload data bit is known, since the non-payload data bit is always in a predetermined position relative to the errored bit. The apparatus thus determines a nominal non-payload data bit, and the nominal non-payload bit is stripped out of the signal by the barrel shifter 45. The stripped signal is then compared to a PRBS generated by the second PRBS detector 47. If the signal is good and the mismatch detected by the first PRBS detector 44 is the deliberately inverted bit, then the nominally identified non-payload data bit will be the actual non-payload data bit, and this will become evident because no mismatches will be detected by the second PRBS detector 47.

In the situation where more than one error exists, the circuit will still assume that an alignment exists but the second detector 47 will detect that the removal of the framing bits and re-inversion of the errored bit does not produce an error free stream and the search process will repeat.

The error indicating bits are decoded to produce an offset position for the barrel shifter. In addition, the first error detected after a search begins will cause the framing counter to reset. The barrel shifter shifts incoming data to a position that assumes that the framing bits are extracted. In the byte following that in which an error is detected, the framing bit is removed and the barrel shifter then shifts to the next byte alignment until the following framing bit.

The controller 50 is initially in a first waiting state and acts to initialise the barrel shifter and counter 49 upon receipt of an error signal (mismatch detection) from the first detector 44. Thereafter the controller enters a second state in which it does not react to further error signals.

Figure 5:
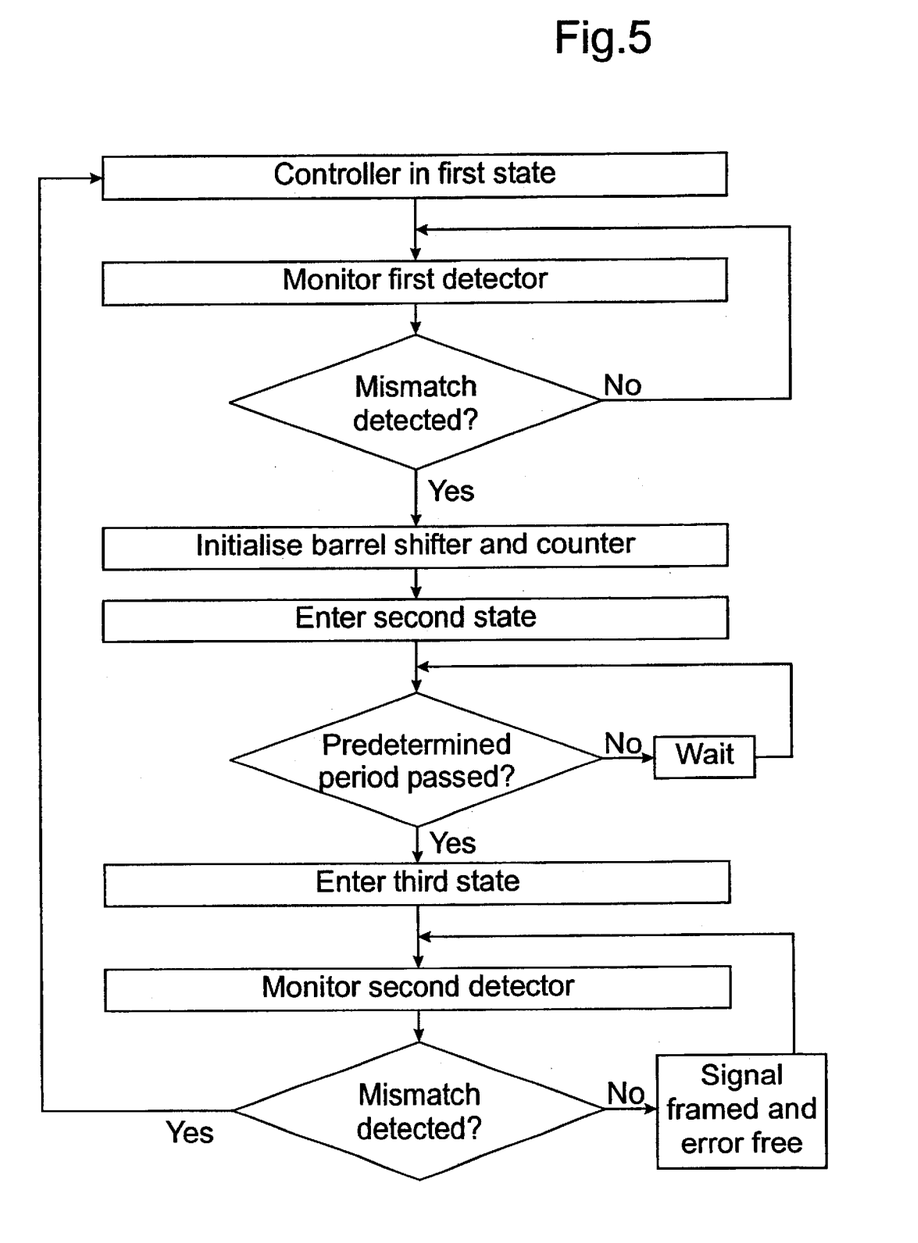
FIG. 5 is a block diagram illustrating the function of a controller included in the embodiment of FIG. 4.

The controller remains in its second state for a predetermined period in order to allow the incoming signal to be processed by the barrel shifter 45 and the second detector 47 and to prevent reaction to mismatches caused by the first detector generating a comparison signal which is caused to deviate from the PRBS signal by non-PRBS elements in the incoming signal. Once the predetermined period has elapsed and these errors have passed through the system, the controller then enters a third state in which it is responsive to error signals from the second detector 47 but not from the first detector 44. If the second detector does not detect any mismatches (corresponding to a correctly framed, error-free signal), the controller remains in its third state. The counter 50 and barrel shifter 45 will continue to remove framing bits correctly and the second detector will continue to detect no mismatches. If mismatches are detected by the second detector 47, then the controller 49 returns to its first state where the next error detected by the first detector 44 will cause the counter to reset and the barrel shifter to realign, and thus effect a further determination of whether the nominally determined non-payload data (or framing) bit is indeed a framing bit. Operation of the controller 49 is illustrated in schematic form by FIG. 5.

Figure 4:
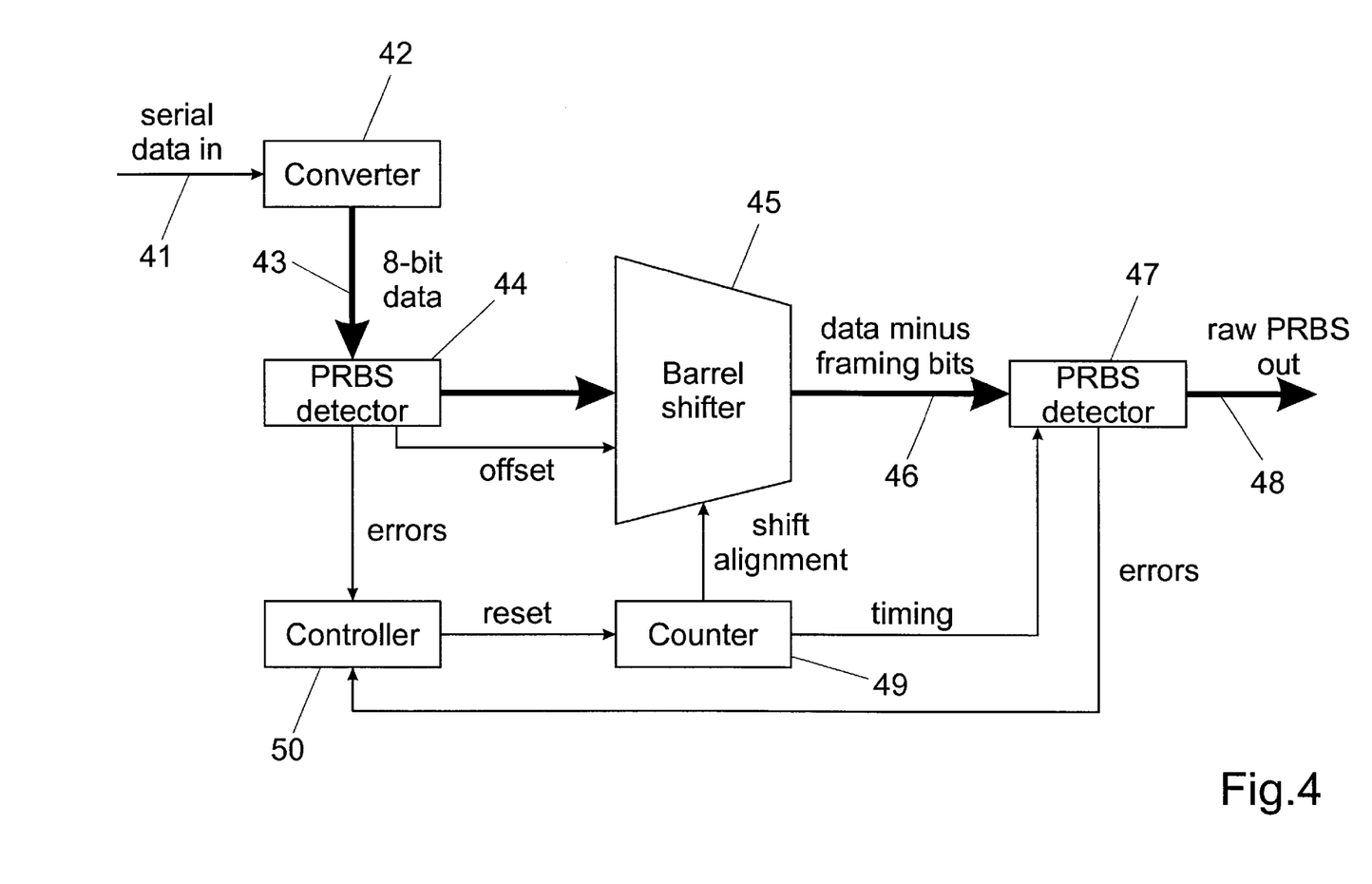
FIG. 4 illustrates an embodiment of receiving apparatus for a DS3 signal in block form.

The output 48 of the apparatus shown schematically in FIG. 4 is thus either an error-free PRBS signal or a corrupted version of the incoming errored signal. Service disruption measurements need to detect only that a signal includes errors or is error-free, so the introduction of additional errors into an already faulty stream is acceptable.

Figure 6:
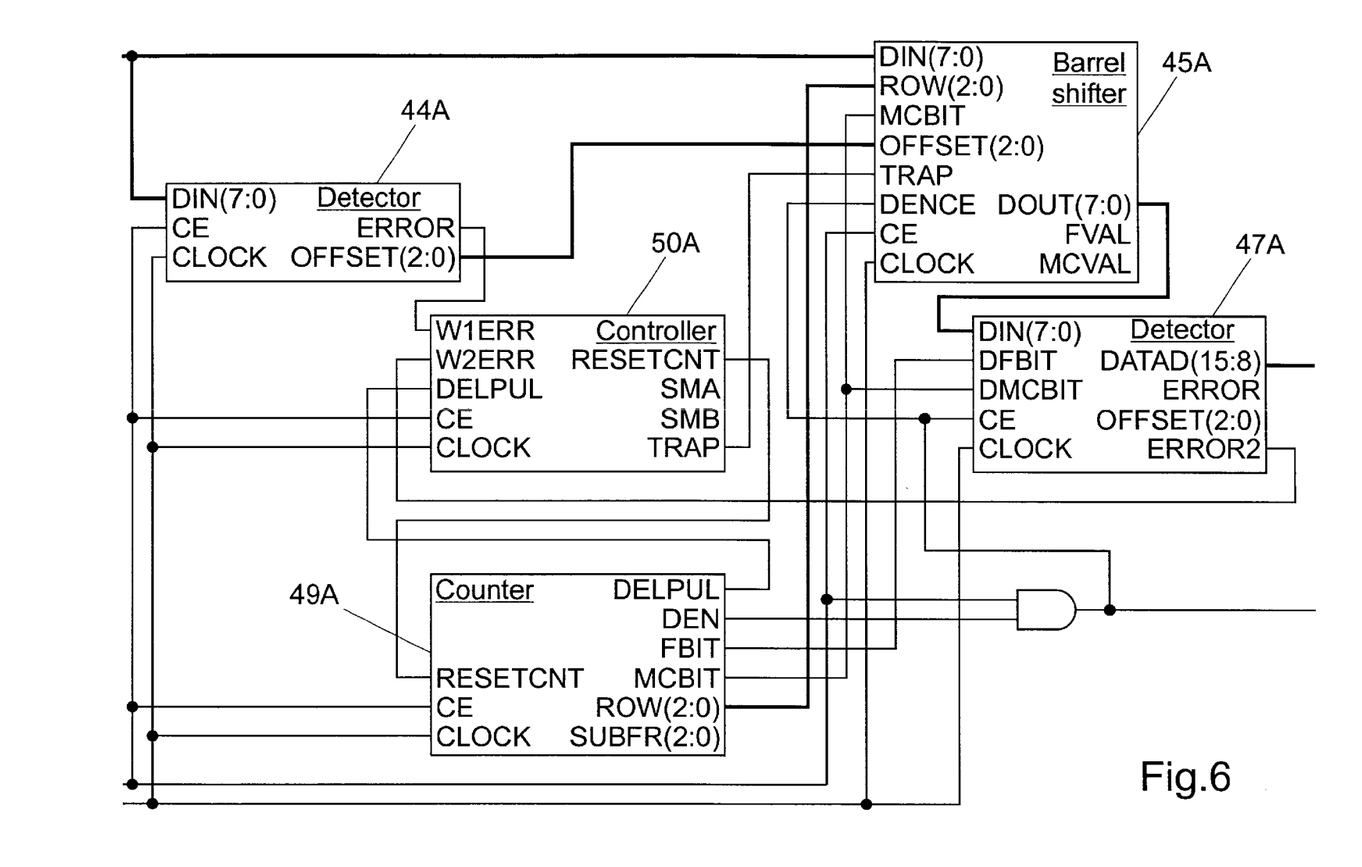
FIG. 6 is a circuit diagram of an embodiment of receiving apparatus for analysing a DS3 signal.

FIG. 6 is a circuit diagram of an embodiment of receiving apparatus for analysing a DS3 signal, and corresponds generally to the apparatus of FIG. 3. The data is processed in parallel form, and in FIG. 5 the bold lines represent parallel signal paths (eight paths, for the processing of 8-bit bytes) in this embodiment. The circuit includes a first detector 44A, a barrel shifter 45A, a second detector 47A, a frame counter 49A and a controller 50A, corresponding to the same elements shown in FIG. 4.

Figure 7:
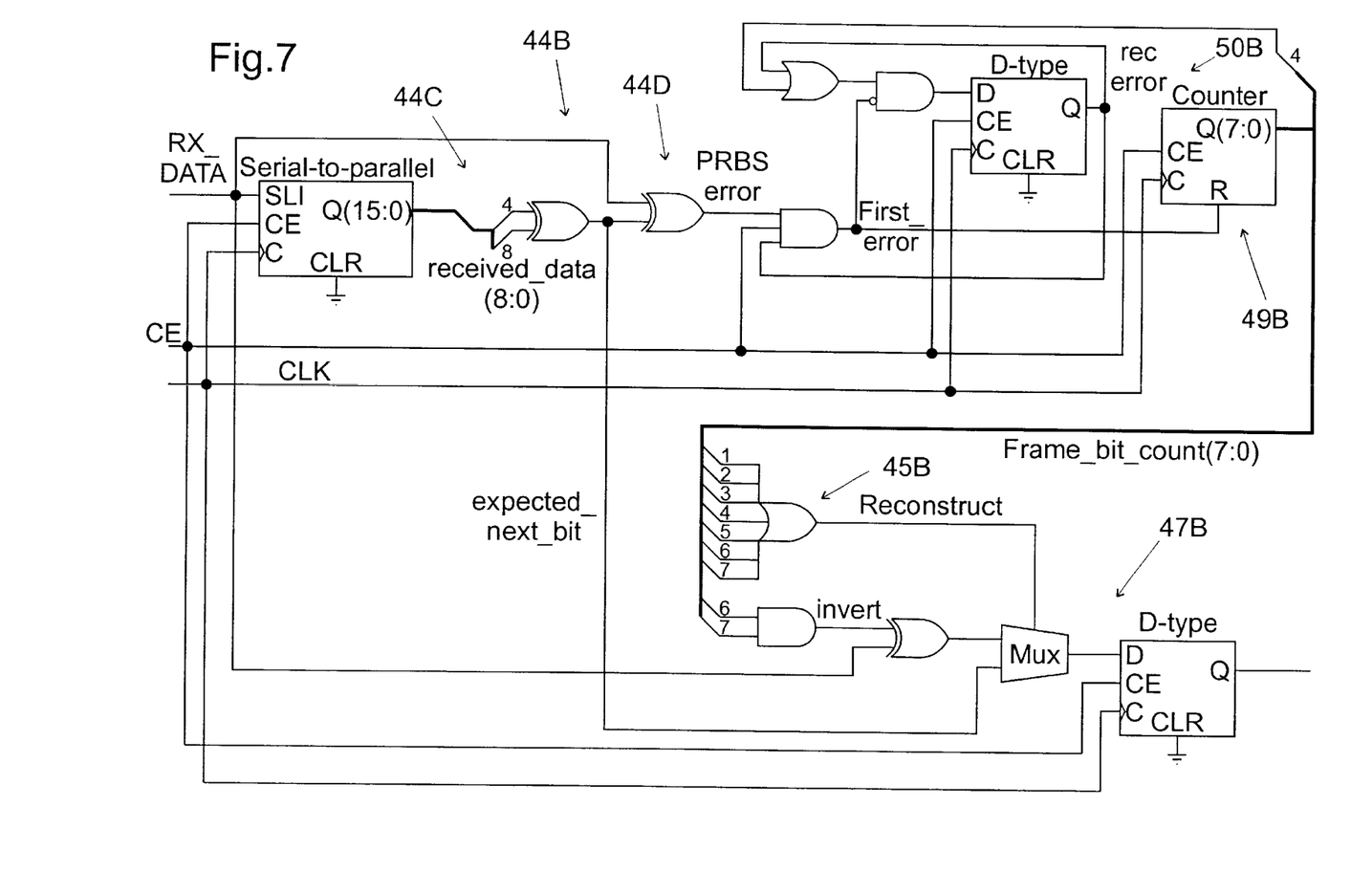
FIG. 7 is a circuit diagram of an embodiment of receiving apparatus for analysing a DS1 signal.

FIG. 7 is a circuit diagram of an embodiment of receiving apparatus for analysing a DS1 signal. The data is processed in serial form. The circuit includes a first detector 44B (which includes a comparison signal generating element 44C and an error detecting element 44D), a controller 50B, a counter 49B, and a second detector 47B. A processor 45B is provided for processing the incoming signal, on the basis of a detected mismatch, in order to reconstitute the PRBS if the nominally identified non-payload data element is truly a non-payload data element, and the incoming signal is error free.

Figure 8:
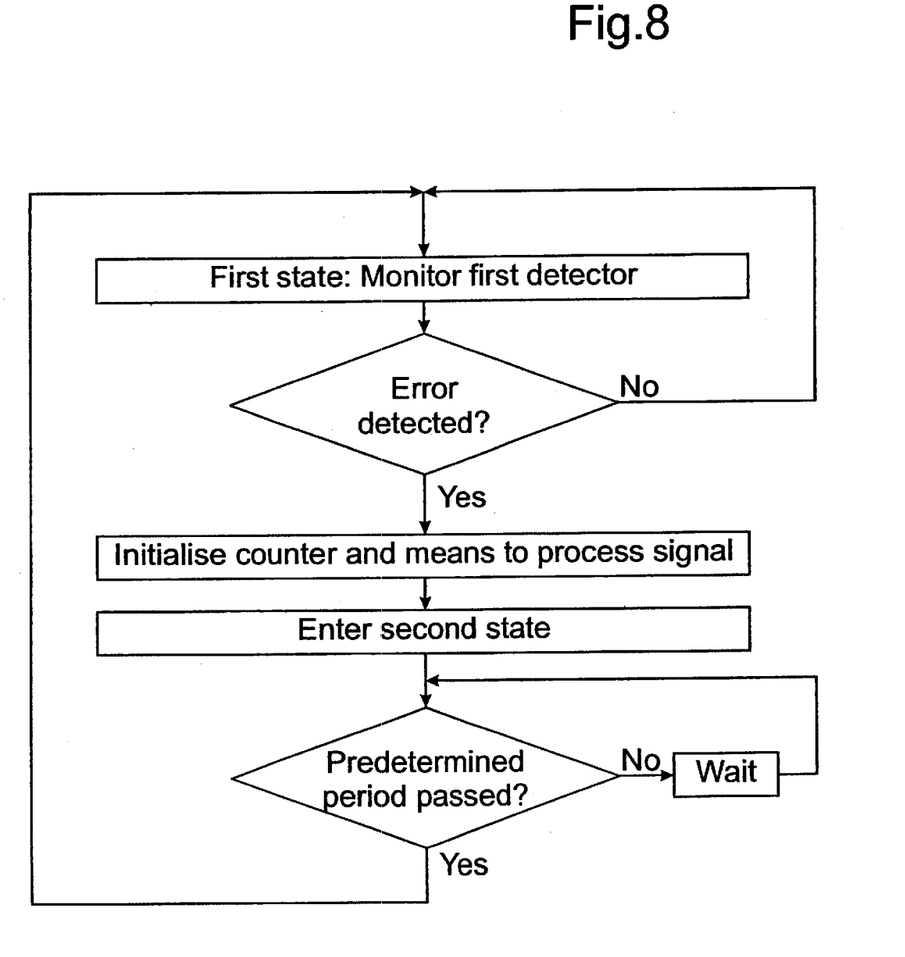
FIG. 8 is a block diagram illustrating the function of a controller included in the embodiment of FIG. 7.
Figure 9:
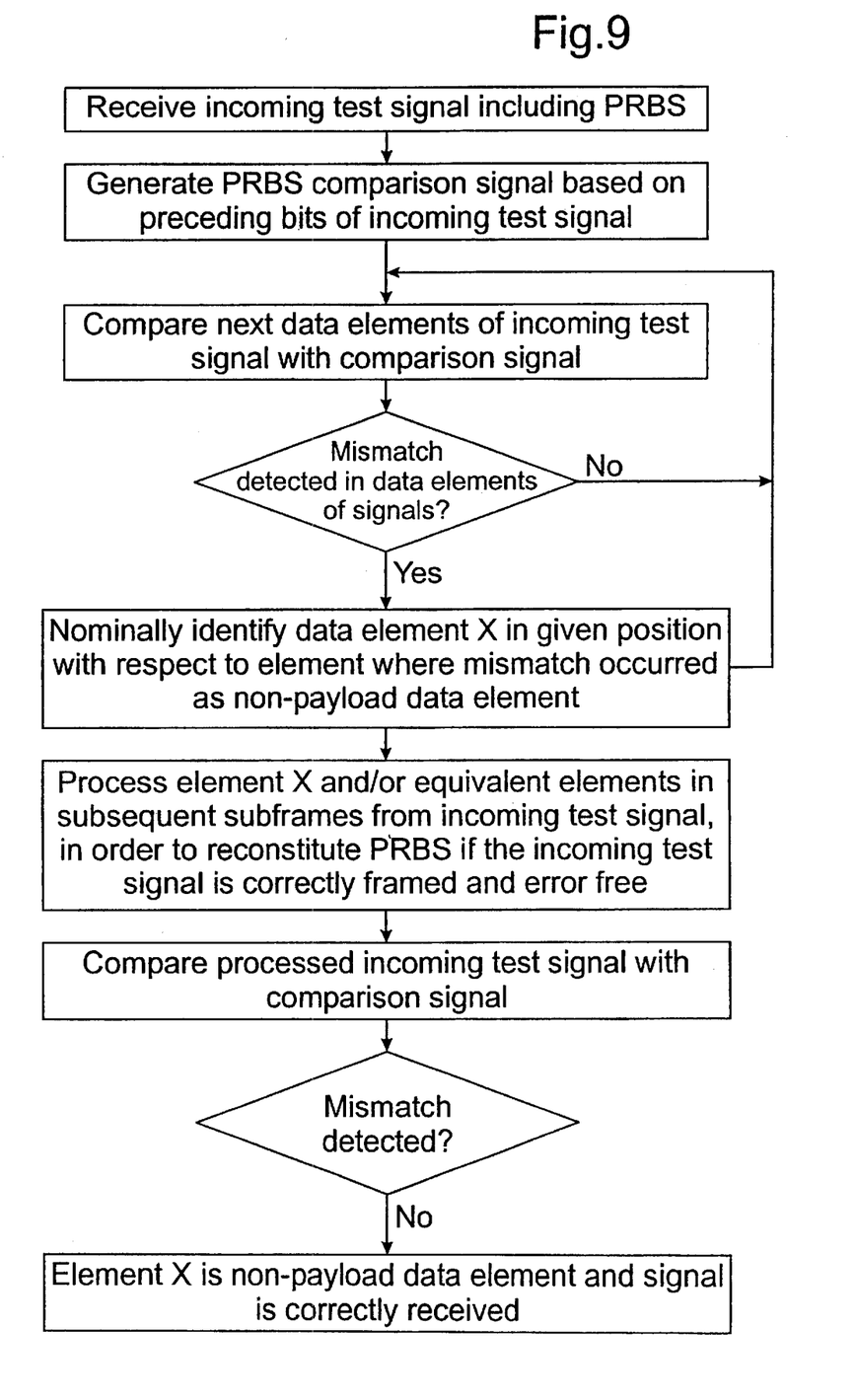
FIG. 9 is a flow diagram illustrating a method in accordance with the present invention in simplified form.

However, this embodiment differs from the embodiment of FIGS. 3 to 6 in that the controller is not responsive to errors detected by the second detector 47B. Instead the controller 50B, in its first state, initialises the counter 49B and processor 45B upon detection of a mismatch at the first detector 44B, then enters a second state in which it is non-responsive to mismatches from the first detector 44B for a predetermined period and then returns to its first state. Thus when receiving a clean incoming signal, the controller 50B will re-initialise the counter 49B and processor 45B once every subframe. This still results in the output, after processing by the processor 45B, of a reconstituted PRBS in response to a clean incoming signal. FIG. 8 illustrates the operation of the controller 50B in the embodiment of FIG. 7, and FIG. 9 is a representation, of similar form to FIG. 3, illustrating operation of the embodiment of FIG. 7.

Figure 10:
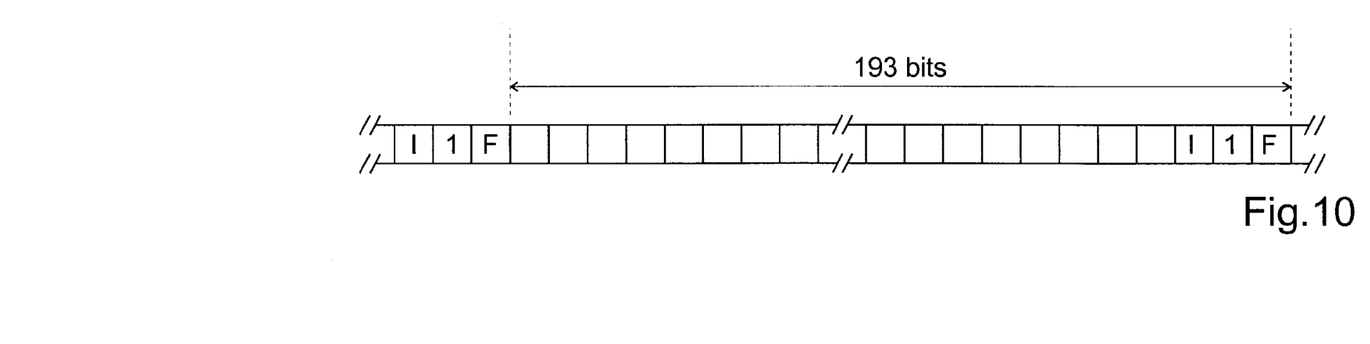
FIG. 10 shows an example of a DS1 test signal.

FIG. 10 shows an example of a DS1 test signal into which framing bits F have been overwritten every 193 bits, and into which violations (or inverted bits) I have been overwritten to act as markers for the framing bits. In this example a violation is overwritten two bits before each of the framing bits and a fixed 1 is overwritten on the bit between the violation and the framing bit. (The purpose of providing a fixed 1 is to avoid the possibility of long runs of zeroes which are not desirable in the test signal.) Of course many other configurations of test signal can be used with the method according to the present invention.

Figure 11A:
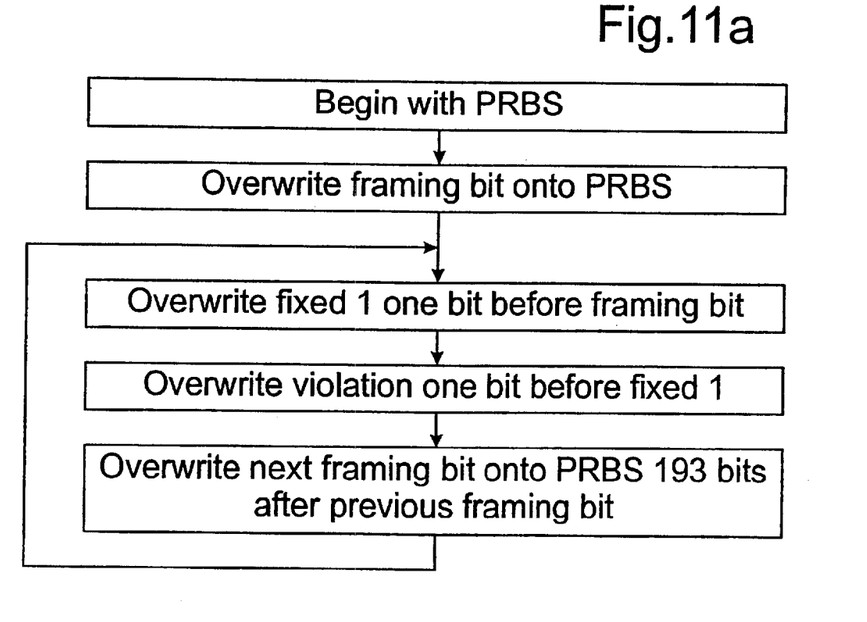
FIG. 11a illustrates construction of the test signal of FIG. 10 from a PRBS.
Figure 11B:
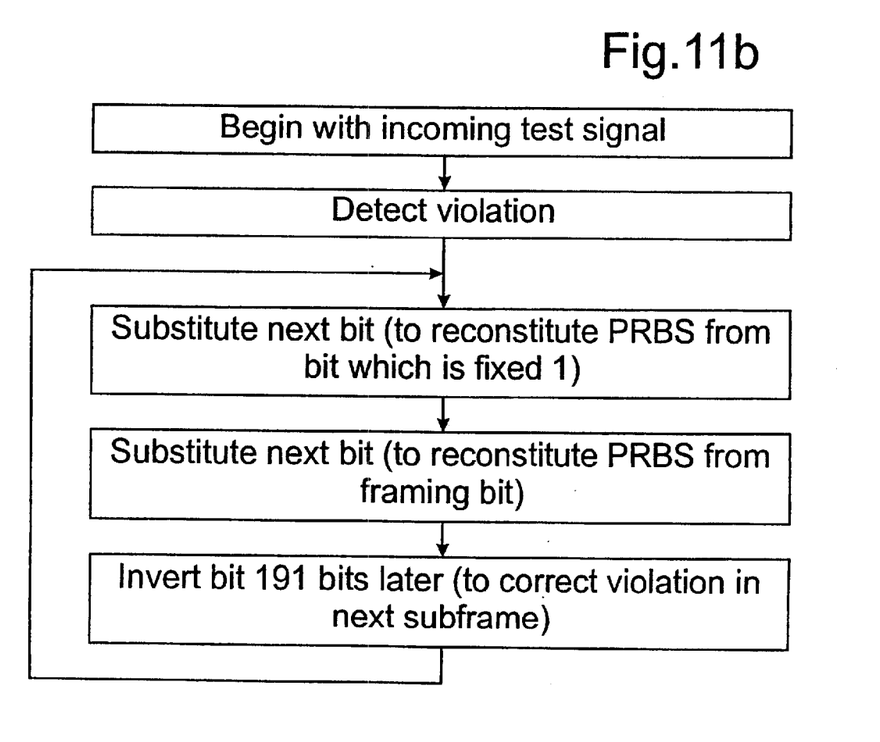
FIG. 11b illustrates reconstruction of the PRBS from the test signal of FIG. 10.

FIG. 11a shows the process of formulating the DS1 test signal of FIG. 10 from a PRBS. The framing bit is overwritten onto the PRBS, a fixed 1 is overwritten onto the bit immediately before the framing bit, and a violation is overwritten onto the bit before the fixed 1, i.e. the bit two bits before the framing bit. The framing bit of the next subframe is overwritten onto the PRBS 193 bits after the previous framing bit. FIG. 11b illustrates the processing of the incoming test signal which, when the incoming test signal is error free, will result in reconstitution of the PRBS. This is essentially the reverse of the process of forming the test signal from the PRBS.

It will be appreciated that in the case of the embodiment of FIG. 7 steps (ii) to (iv) of claim 1 are continued not only until, but even after it is determined that the nominally identified non-payload data element is actually a non-payload data element, and that step (iv) is performed by the second detector 47B which does not affect whether steps (ii) and (iii) are repeated.

Modifications and improvements may be incorporated without departing from the scope of the invention.

What is claimed is:

1. A method of analysing signals in order to identify non-payload data elements in an incoming data stream, said incoming data stream comprising a payload data stream in which subsequent elements of the payload data stream are generated from antecedent elements of the payload data stream, said method comprising:
   (i) generating a comparison data stream with a predetermined relationship to the payload data stream for comparison with the payload data stream;
   (ii) detecting a mismatch between the incoming data stream and the comparison data stream;
   (iii) nominally identifying as a non-payload data element a data element which has a predetermined positional relationship, in the incoming data stream, to the data element with which the mismatch is detected;
   (iv) determining whether said nominally identified non-payload data element is a non-payload data element; and
   (v) repeating steps (ii) to (iv) until a nominally identified non-payload element is determined to be a non-payload data element.

2. A method according to claim 1 wherein the payload data stream comprises a pseudo random binary sequence and the comparison data stream also comprises a pseudo random binary sequence.

3. A method according to claim 2 wherein the comparison data stream also comprises a pseudo random binary sequence which is derived from the incoming data stream.

4. A method according to claim 1 wherein the step of determining whether said nominally identified non-payload data element is a non-payload data element comprises the steps of:
   (I) selecting at least one data element, which occurs at a predetermined positional relationship in the data stream to said nominally identified non-payload data element, and processing said at least one said selected data element form the incoming data stream; and
   (II) comparing said processed incoming data stream with the comparison data stream;
   wherein a match between the processed incoming data stream and the comparison data stream indicates that the nominally identified non-payload data element is a non-payload data element.

5. A method according to claim 1 wherein the step of determining whether said nominally identified non-payload data element is a non-payload data element comprises the steps of:
   processing the incoming data stream in such a way that parts of the incoming data stream which would be expected to differ from the comparison data stream are removed or disregarded; and
   comparing the processed incoming data stream with the comparison data stream; wherein a match between the processed incoming data stream and the comparison data stream indicates that the nominally identified non-payload data element is a non-payload data element.

6. A method according to claim 5 wherein the step of processing the incoming data stream includes stripping out, inversion or substitution of the nominally identified non-payload data element.

7. A method according to claim 1 wherein the data element which is nominally identified as a non-payload data element is the data element in which the mismatch is detected.

8. A method according to claim 1 wherein the data element which is nominally identified as a non-payload data element is a pre-determined number of data elements apart from the data element in which the mismatch is detected.

9. A method according to claim 6 wherein the element which is nominally identified as the non-payload element is spaced apart from the data element in which the mismatch is detected by an integral number of bytes, and most preferably a single byte.

10. A method according to claim 1 wherein the incoming data stream is organised as a parallel data bus, most preferably an eight bit wide bus, before sensing for a mismatch.

11. A method according to claim 1 wherein the non-payload data elements which are identified are framing or overhead elements.

12. A method according to claim 9 wherein said method includes further steps for measurement of the starting time at which the incoming data stream is adequately received.

13. A method according to claim 1 wherein when the nominally identified non-payload data element is determined to correspond to a true non-payload data element, this indicates that the incoming data stream is adequately received.

14. A method as claimed in claim 1 wherein said method is used in the framing of a signal, and said framed signal is used in a service disruption measurement.

15. A method according to claim 1 wherein steps (ii) to (iv) continue to be repeated even after the nominally identified non-payload data element is determined to be a non-payload data element.

16. A method according to claim 1 wherein after determination that the nominally identified non-payload data element is a non-payload data element, repetition of steps (ii) to (iv) is inhibited until analysis of the payload data of the incoming signal indicates that the incoming signal is not error free.

17. Apparatus for analysing signals in order to identify non-payload data elements in an incoming data stream, the incoming data stream comprising a payload data stream in which subsequent elements of the payload data stream are generated from antecedent elements of the payload data stream, the apparatus comprising:

a generator for generating a comparison data stream with a predetermined relationship to the payload data stream;

a first detector for detecting mismatches between the incoming data stream and the comparison data stream;

processing means to process at least one element of the incoming data stream which has a known predetermined, positional relationship to a data element in response of which a mismatch is detected, said at least one data element comprising a nominally determined non-payload data element;

a second detector for determining whether the nominally determined non-payload data element is a non-payload data element;

a controller to activate the processing means to process a further at least one data element, having a known positional relationship to a different data element of the incoming data stream in which an error is detected, when the second detector determines that the nominally determined non-payload data element is not a non-payload data element.

* * * * *